Dec. 2, 1924.
J. DE PAYE
FISHHOOK
Filed May 12, 1923
1,518,052
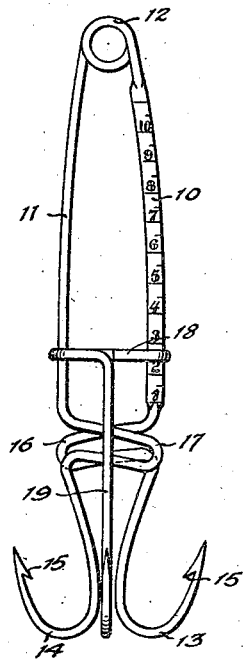
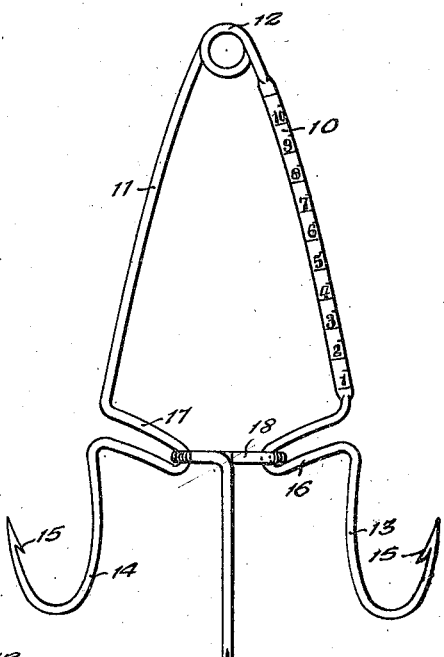
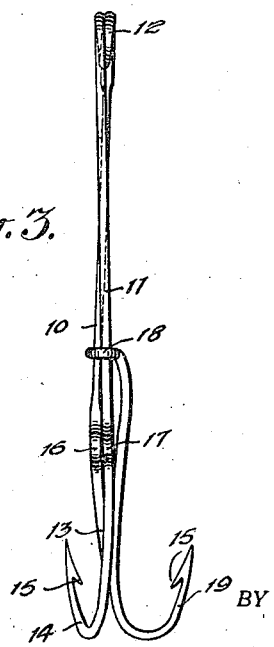
WITNESSES
Geo. W. Naylor
E. W. Savage
INVENTOR
JEAN DE PAYE
BY
Munn & Co
ATTORNEYS Patented Dec. 2, 1924.

1,518,052

UNITED STATES PATENT OFFICE.

JEAN DE PAYE, OF SAYVILLE, NEW YORK, ASSIGNOR OF ONE-FOURTH TO ARTHUR F. CAMBERN, OF SAYVILLE, NEW YORK, AND ONE-EIGHTH TO JOSEPH FIALA, OF BOHEMIA, NEW YORK.

FISHHOOK.

Application filed May 12, 1923. Serial No. 638,593.

*To all whom it may concern:*

Be it known that I, JEAN DE PAYE, a citizen of the United States, and a resident of Sayville, in the county of Suffolk and State of New York, have invented new and useful Improvements in Fishhooks, of which the following is a full, clear, and exact description.

The general object of this invention is the provision of a fishhook provided with a plurality of hook members normally grouped together by a member that may be actuated to release the hook members by the fish taking the bait and capable of expansion when released to grip the fish.

A further object of the invention is the provision of a multiple fishhook including means for actuating the fishhook, and means for indicating the force applied to operate the actuating means so that the fishhook may be used as a scales.

These objects are accomplished by providing a plurality of depending arms having their upper ends connected together by spring members tending to retain the lower ends of the arms spaced apart, forming on the lower ends of the arms hook members, slidably mounting on the arms a loop member which serves to normally retain the hook members grouped together, and providing means permitting the release of the hook members upon the actuation of the loop. By marking on one of the depending arms a scale for indicating the force necessary to move a loop member through a certain distance against the friction between the loop member and the arms a scales is provided.

These and other objects of the invention will be more clearly understood from the following detailed description and accompanying drawings.

Figure 1 is a side elevation of the multiple fishhook showing the hook members grouped together;

Figure 2 is a side elevation of the multiple fishhook similar to that shown in Figure 2 but with the hook members spread apart;

Figure 3 is an edge elevation of the multiple fishhook.

Referring to the above-mentioned drawings, the invention includes two depending arms 10 and 11 formed with a spring 12 joining their upper ends. This spring 12 normally tends to retain the lower ends of the arms 10 and 11 spread apart. Hook members 13 and 14 are formed on the lower ends of the arms 10 and 11, respectively. These hook members are of ordinary construction, provided with barbs 15, and they are so positioned that they extend outward. U-shaped bends 16 and 17 are formed in the arms 10 and 11, respectively, for receiving a loop member 18 slidably mounted on the arms 10 and 11. This loop member is mounted on the arms for normally retaining the hooks 13 and 14 grouped together. A hook 19 depends from the loop 18 and would normally be used as the bait hook. The length of the shank of the hook 19 is such that when the loop member is properly positioned to permit its easy operation the hook is grouped with the hooks 13 and 14. Since the spring 12 normally tends to spread the lower ends of the arms 10 and 11 outwardly they exert a force on the loop member 18. Consequently, the force required to move the loop member from point to point on the arms 10 and 11 would vary. By graduating the arms so as to indicate the force required to move the loop member 18 a scales is provided. As shown in this form of the invention only the arm 10 is graduated.

The operation of the multiple fishhook is as follows:

The loop 18 is set so that the hook 19 is grouped with the hooks 13 and 14. The hook 19 is baited and the unit is then ready for use. When a fish strikes the bait, exerting a downward force on the hook 19, the loop 18 is drawn downward from the arms 10 and 11. As soon as the arms 10 and 11 are released the hooks 13 and 14 are projected outward, the loop 18 passing into the U-shaped bends 16 and 17. When the hooks 13 and 14 are projected outward they engage the sides of the mouth of the fish, firmly gripping it and preventing the possibility of escape.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. A multiple fish hook, comprising a plurality of fish hooks, means tending to spread the hooks apart, a member slidable on the shanks of the hooks and holding the hooks grouped together, said member being provided with a fish hook rigid therewith and normally grouped with the first hooks, and means for permitting the first hooks to be released and projected outward when the hook carried by the slidable member is moved downward below the said first hooks.

2. A multiple fishhook, comprising a plurality of depending shanks connected at their upper ends, inwardly extending U-shaped bends formed in the shanks, means mounted on the shanks for normally retaining the hook members grouped, and a hook member depending from said retaining means presenting a means for operating the retaining means to release the hook members to operate said retaining means by drawing the latter into the U-shaped bends.

3. A multiple fishhook, comprising a plurality of depending arms connected at their upper ends by spring means which tend to project the lower ends of the arms away from one another when grouped together, hook members formed on the lower ends of said arms, a loop member slidably mounted on the arms for retaining the hook members grouped together, inwardly extending U-shaped bends formed in the arms for receiving the loop to permit the spreading apart of the lower ends of the arms and the hook members, and a hook depending from said loop presenting a means for drawing it into said U-shaped bends to release the arms.

4. A multiple fishhook, comprising a plurality of depending arms connected at their upper ends, hook members formed on the lower ends of said arms, means for normally retaining said hook members grouped together, U-shaped bends formed in the depending arms for receiving means provided for retaining the hook members grouped together in order to release the depending arms, a hook member carried by said retaining means presenting a means for operating the latter, and means for operating the depending arms to project the hook members outward when released from the means provided for retaining them grouped.

5. A multiple fishhook, comprising a plurality of depending arms, hook members formed on the lower ends of said depending arms, means slidably mounted on said depending arms for normally retaining the hook members grouped together, inwardly extending U-shaped bends formed in said arms for receiving the slidably mounted means provided for retaining the hook members grouped together to permit the spreading of the hook members, a hook depending from said slidably mounted grouping means to present a means for operating the latter, and a scale provided on one arm for indicating the force necessary to draw the slidably mounted member along the depending arms thus providing a scales.

JEAN de PAYE.